United States Patent [19]

Higashi

[11] Patent Number: 4,885,494
[45] Date of Patent: Dec. 5, 1989

[54] MOTOR AND MOTOR DEVICE
[75] Inventor: Kazuhiko Higashi, Nagasaki, Japan
[73] Assignee: Mitsubishi Denki Kabushiki Kaisha, Tokyo, Japan
[21] Appl. No.: 272,332
[22] Filed: Nov. 17, 1988
[30] Foreign Application Priority Data Nov. 27, 1987 [JP] Japan ................. 62-300675

[51] Int. Cl.[4] .......................................... H02K 17/16
[52] U.S. Cl. ..................................... 310/211; 310/52; 310/201; 505/1
[58] Field of Search .................. 310/52, 61, 201, 211, 310/212, 261; 505/1

[56] References Cited

U.S. PATENT DOCUMENTS

| | | | |
|---|---|---|---|
| 3,898,490 | 8/1975 | Wedman | 310/52 |
| 4,031,421 | 6/1977 | Geiger | 310/112 |
| 4,034,245 | 7/1977 | Mailfert et al. | 310/52 |
| 4,037,123 | 7/1977 | Mole et al. | 310/52 |

OTHER PUBLICATIONS

Fisher, Arthur, "Superconductivity", *Popular Science*, Apr. 1988, pp. 54–58.

*Primary Examiner*—Patrick R. Salce
*Assistant Examiner*—Anita M. Ault
*Attorney, Agent, or Firm*—Burns, Doane, Swecker & Mathis

[57] ABSTRACT

This invention relates to a motor and a motor apparatus and is so constructed that end rings and bars composing a squirrel cage rotor of the motor are formed in a hollow or grooved shape and superconductive materials are filled within said end rings and bars to form looped circuits, which are symmetrical relative to a center line of a field, of a number equal to a number of poles, by the superconductive materials filled in each two bars and both end rings, so that the motor exhibits starting characteristics similar to those in an induction motor using a squirrel cage rotor composed of usual conductors by starting in an atmosphere of room temperature, and the operational characteristics as a very highly efficient synchronous motor by cooling the rotor to a critical temperature or less of the superconductive material after starting a permanent direct current flows through field windings composed of the superconductive materials.

13 Claims, 5 Drawing Sheets

MOTOR AND MOTOR DEVICE

BACKGROUND OF THE INVENTION

1. Field of the Invention

The present invention relates to a novel motor using superconductive materials, in particular to a motor apparatus provided with cooling means.

2. Description of the Prior Art

In the conventional squirrel cage induction motor a short-circuit looped in itself is formed in a squirrel cage rotor comprising a plurality of bar conductor short-circuited by two circular conductors opposite to each other at both ends thereof and power-supplied by an electro-magnetic induction from a stator side to generate a torque. Accordingly, the squirrel cage rotor is rotated at a speed of rotation slightly smaller than that of a rotational magnetic field generated by the stator.

On the other hand, in a synchronous motor a rotational magnetic field is generated by a stator similar to that in an induction motor. At starting, a rotor is rotated in the principle similar to that in the induction motor to start the synchronous motor and then the rotor (field) is excited by a direct current to rotate the rotor at the same speed of rotation as that of a rotational magnetic field generated by the stator, that is, synchronously.

FIG. 1 is a sectional view taken along the plane including an axis of rotation, showing a construction of the above described conventional general squirrel cage rotor;

FIG. 2 is a partial developed view taken along the rotational direction by the line II—II in FIG. 1; and FIG. 3 is a partial sectional view taken along the direction meeting with the axis of rotation at right angles, showing a construction of an iron core.

An iron core 1 is formed of a large number of electro-magnetic sheet steels stuck together or cast cylindrically.

The iron core 1 is firmly mounted on a motor shaft 6 by two clampers 3 from both sides thereof in an axial direction thereof so that a center axis thereof may coincide with a center aixs of the motor shaft 6.

A plurality of slots 2 are formed in a direction along the center axis of the iron core 1 by punching or machining so as to pass through the iron core 1, as shown in FIG. 2 showing a sectional view taken along the direction meeting with the center axis at right angles.

Bars 4 made of metallic conductors formed of, for example, copper, aluminum or alloys thereof and the like are inserted into the respective slots 2. And, end rings (circular conductors) 5 made of the metallic conductors similar to the bars 4 are connected to both ends of the respective bars 4 by brazing or welding to electrically short-circuit, whereby constructing the squirrel cage rotor (secondary circuit) of the induction motor.

In the induction motor using the conventional squirrel cage rotor having such the construction, the squirrel cage rotor has a resistance, so that, as shown in FIG. 4(1) showing torque-speed characteristics, if a voltage is applied, the induction motor is started wth overcoming a load and gradually accelerated until the speed close to the synchronous speed, and then rotated under the well-balanced condition with the load torque with keeping the slip so that the speed of rotation may be slightly smaller than the synchronous speed by designing various kinds of factor so that a starting torque larger than the load torque (4) may be generated.

Now, in the general motor, in order to improve the starting characteristics, the secondary resistance is increased but if the size of the conductor is increased, the heat capacity is increased. On the contrary, in the induction motor using the squirrel cage rotor in the above described manner the resistance of the squirrel cage rotor as the secondary resistance has not been made variable. Accordingly, a problem occurs in that if the squirrel cage rotor is large-sized with fixing the resistance thereof, an electric loss, which is proportional to the large secondary resistance, is generated also in the constant-speed driving after the completion of starting, so that the driving efficiency is remarkably reduced.

On the other hand, the synchronous motor is advantageous from viewpoints of the efficiency and the power factor during the driving after the starting thereof but problems occur in that the insulation of the field coil is required, the construction being complicated on account of such the requirement, and the provision of also damper windings being required for the starting stability and the transition stability as the induction motor, whereby the conductor cannot take such the large size as the squirrel cage rotor in the usual induction motor, also the starting torque being limited, and the like.

SUMMARY OF THE INVENTION

The present invention has been achieved for solving the above described problems. It is a main object of the present invention to provide a novel motor capable of exhibiting a high efficiency with increasing a resistance of a squirrel cage rotor of a secondary resistance as an induction motor at starting and making a resistance of field windings zero as a synchronous motor after starting.

It is a second object of the present invention to provide a motor apparatus comprising a cooling means for cooling the above described novel motor using superconductive materials.

In the motor according to the present invention, a squirrel cage rotor is formed of hollow or grooved end rings and bars both filled with superconductive materials and looped circuits of a number equal to a number of poles are formed symmetrically relative to a center line of a field by the superconductive materials filled in two bars and both end rings. In the motor according to the present invention, the starting characteristics similar to those in the induction motor using the squirrel cage rotor formed of the usual conductors are exhibited by adopting such the construction and starting under the circumstances of room temperature. In addition, since a permanent direct current passes through the field windings formed of the superconductive materials by cooling the rotor at temperatures below a critical temperature of the superconductive materials after starting, the motor according to the present invention can be operated as a remarkably highly efficient synchronous motor. In addition, the motor apparatus according to the present invention is provided with cooling means for cooling the above described motor.

The above and further objects and features of the invention will more fully be apparent from the following detailed description with accompanying drawings.

DESCRIPTION OF THE PREFERRED EMBODIMENTS

The present invention will be below described in detail with reference to the drawings showing one preferred embodiment thereof.

Figure 5:
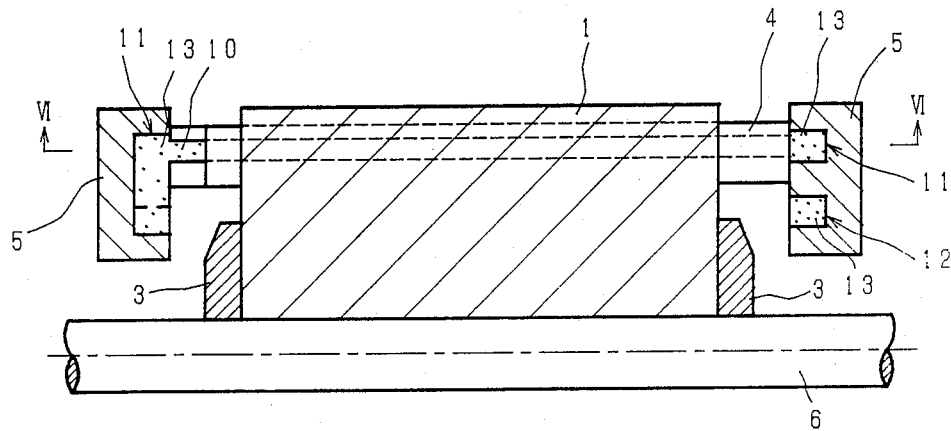
FIG. 5 is a sectional view taken along a plane including an axis of rotation of a squirrel cage rotor of the motor according to the present invention.
Figure 6:
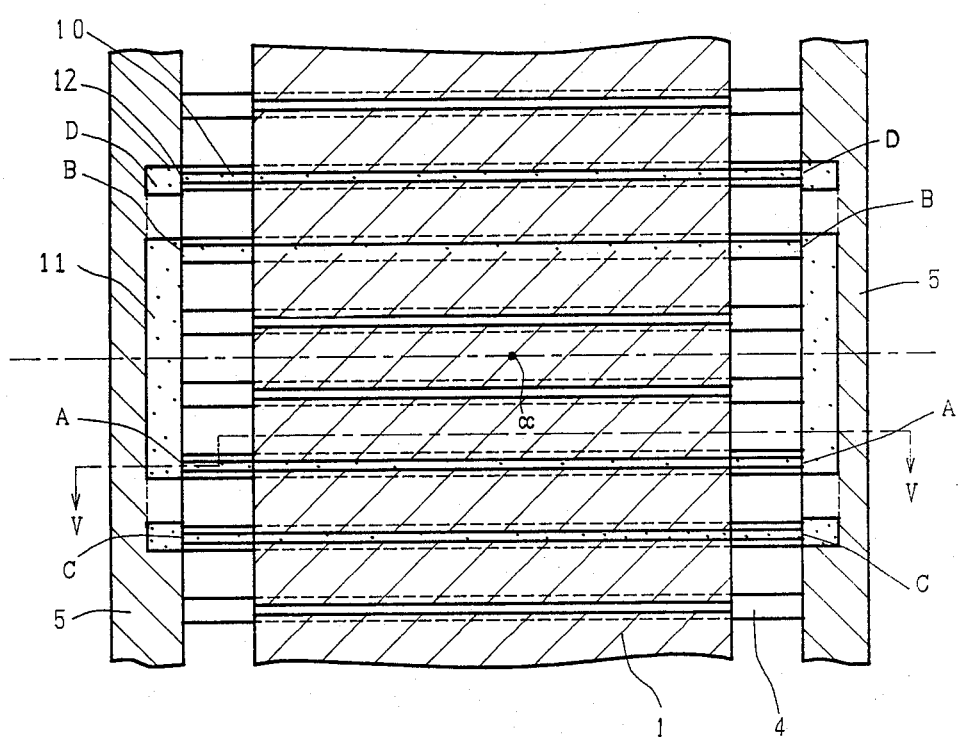
FIG. 6 is a partial developed view taken along a rotational direction of said squirrel cage rotor.
Figure 7:
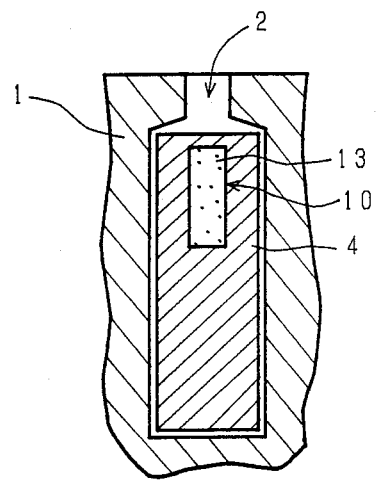
FIG. 7 is a partial sectional view taken along a direction meeting at right angles with the axis of rotation.
Figure 8:
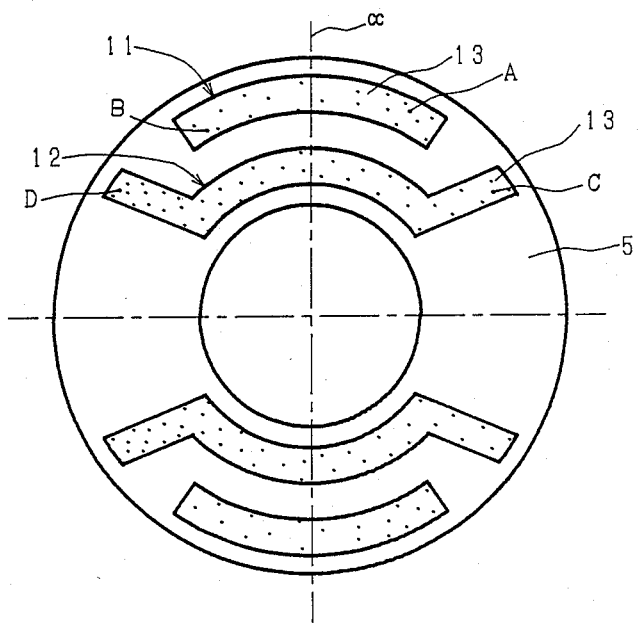
FIG. 8 is a front view showing a construction of an end ring.

FIG. 5 is a sectional view taken along a plane including an axis of rotation, showing a construction of the motor according to the present invention;

FIG. 6 is a partial developed view taken along a rotational direction by the line VI—VI of FIG. 5;

FIG. 7 is a partial sectional view taken along a direction meeting at right angles with the axis of rotation showing a construction of an iron core; and FIG. 8 is a front view taken along the direction of the axis of rotation showing an end ring.

Figure 1:
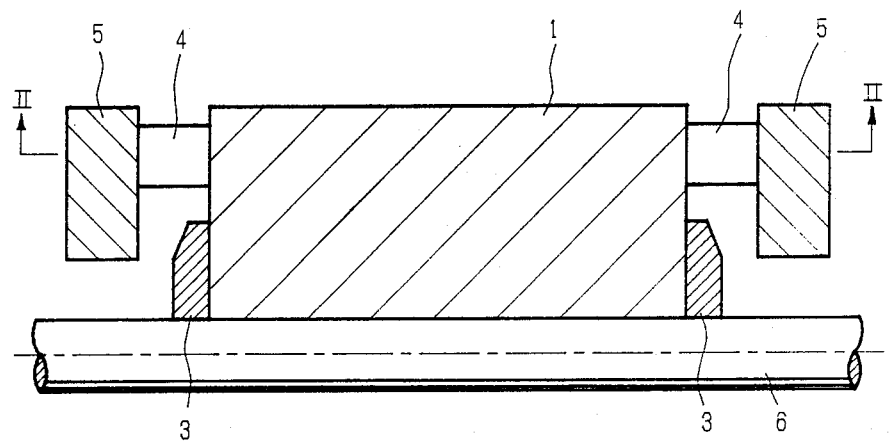
FIG. 1 is a sectional view taken along a plan including an axis of rotation of the conventional squirrel cage rotor for use in an induction motor.
Figure 2:
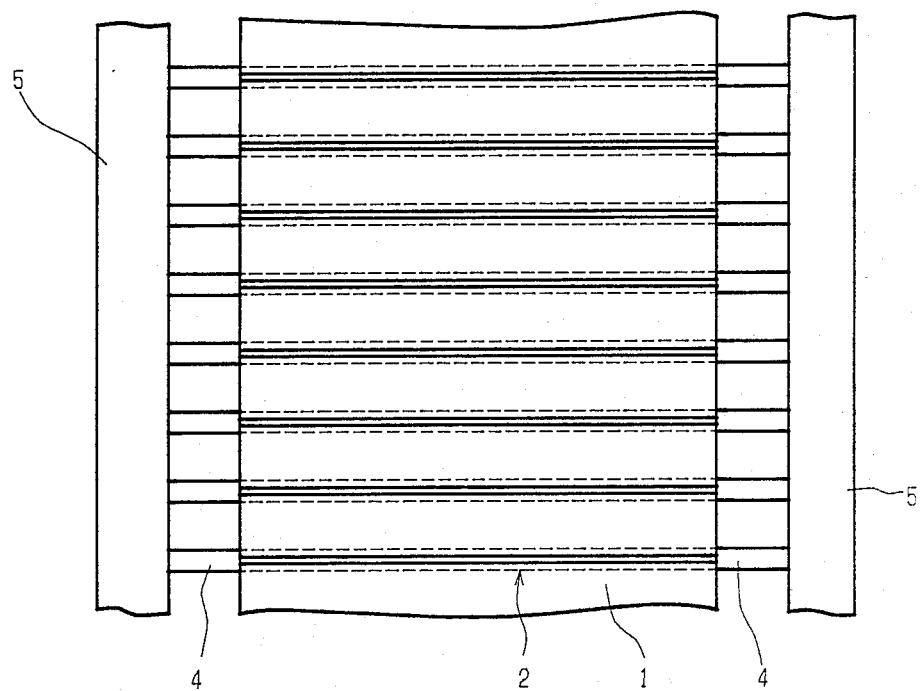
FIG. 2 is a partial developed view taken along a rotational direction of said squirrel cage rotor.
Figure 3:
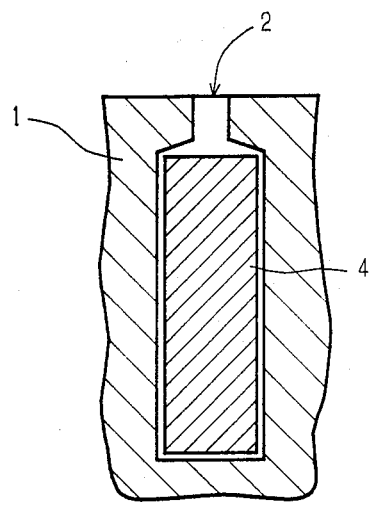
FIG. 3 is a partial sectional view taken along a direction meeting at right angles with the axis of rotation.

In addition, FIG. 5 is a sectional view of the motor, taken along the line V—V shown in FIG. 6. In addition, parts, which are identical with or corresponding to those shown in FIGS. 1 to 3 referred for the description of said prior art, are marked with identical reference numerals.

An iron core 1 is formed of a large number of electromagnetic sheet steels stuck together or constructed cylindrically by cast steels and the like.

This iron core 1 is firmly mounted on a motor shaft 6 by clampers 3 from both sides thereof in an axial direction so that a center axis thereof may be identical with a center axis of the motor shaft 6.

A plurality of slots 2 are formed in a direction along the center axis of the iron core 1 by punching or machining so as to pass through the iron core 1, as shown in FIG. 7 showing a sectional view taken along a direction meeting at right angles with the center axis.

A bar 4 made of a metallic conductor formed of copper, aluminum or alloys thereof or the like is inserted into each of the slots 2. And, end rings (circular conductors) 5 made of a metallic conductor similar to the bars 4 are connected to both ends of the respective bars 4 by brazing or welding to electrically short-circuit, whereby forming a squirrel cage rotor (secondary circuit) which is generally used for an induction motor.

In the motor according to the present invention, as shown in FIG. 7, a part of a plurality of bars 4 is formed in a hollow shape and the hollow portions 10 are filled with a superconductive material 13 such as ceramic materials of Y-Ba-Cu-O derivative having a critical temperature of 90 to 100 K.

In addition, as shown in FIG. 8, grooves 11, 12 are formed in both end rings 5 on opposite surfaces thereof, that is, surfaces on which the respective bars 4 are mounted, as shown in FIG. 8, and the superconductive materials 13 similar to those filled in the hollow portions 10 of the above described bars 4 are filled in the grooves 11, 12. And, the superconductive materials 13 filled in the hollow portions 10 of the respective bars 4 and the superconductive materials 13 filled in the grooves 11, 12 of both end rings 5 form a looped circuit by electrically connecting respective points A and respective points B in the groove 11 of both end rings 5 among themselves by means of the bars 4, as shown in FIGS. 5 and 6, while points C and points D in the groove 12 are electrically connected among themselves by means of the bars, respectively, to form a looped circuit.

In addition, the respective looped circuits formed by these superconductive materials 13 are formed symmetrically relative to a center line of a magnetic pole of a squirrel cage rotor shown by CC in FIGS. 6 to 8.

In the practical manufacture of the squirrel cage rotor having such the construction, the superconductive materials 13 are filled in the hollow portions 10 and the grooves 11, 12 of the respective bars 4 and the respective end rings 5 and then baked followed by assembling in a cylindrical cage-like shape by welding or brazing so that the superconductive materials may be electrically connected among themselves. And, the motor according to the present invention has such construction that the looped circuit as field windings formed of the superconductive materials 13 is incorporated in the squirrel cage rotor formed of the usual conductor by adopting such the construction.

The motor according to the present invention having the above described construction operates as follows.

At first, the motor according to the present invention is started at room temperature, more concretely, in an atmosphere of a critical temperature or more of the superconductive materials 13. At this time, the superconductive materials 13 are not under the superconductive condition but operate in the same way as the squirrel cage rotor of the conventional induction motor as a whole of the rotor. At this time, the secondary resistance shows a relatively large value determined by the resistance of the metallic conductor forming the bars 4 and the end rings 5.

Figure 4:
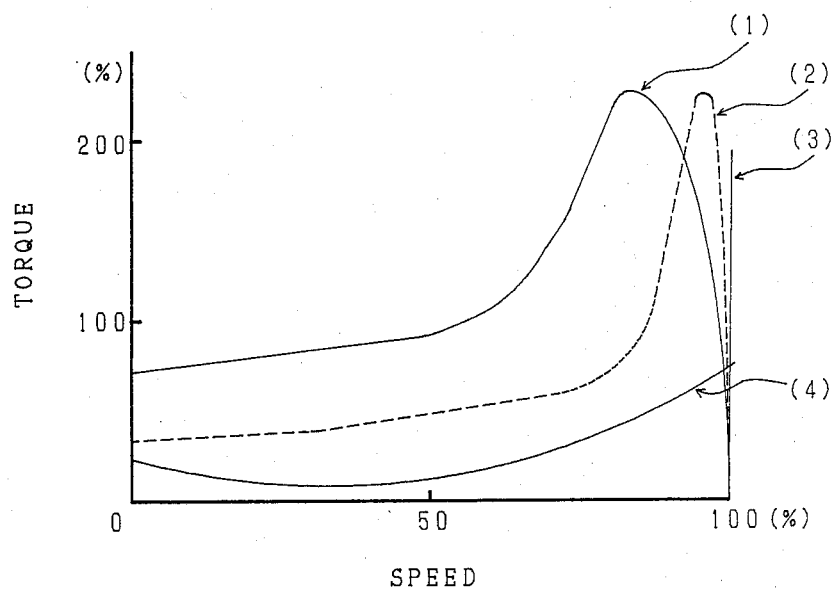
FIG. 4 is a graph showing torque-speed characteristics of the motor according to the present invention and the conventional squirrel cage induction motor.

Accordingly, if a voltage is applied to a stator of the motor, the squirrel cage rotor operates as a usual high-resistance squirrel cage rotor or deep groove rotor, so that the motor exhibits the torque-speed characteristics similar to those of the conventional induction motor shown by (1) in FIG. 4 to be accelerated.

On the contrary, if the rotor is gradually cooled by using of a coolant, such as liquid nitrogen, at the time when the acceleration has been completed after the starting, the resistance of the metallic conductor forming the bars 4 and the end rings 5 is gradually reduced, so that the motor exhibits the torque-speed characteristics shown by (2) in FIG. 4.

And, if the squirrel cage rotor is further cooled to the critical temperature or less of the superconductive materials 13, the condition of the superconductive materials 13 turns to the superconductive condition, so that the resistance of the superconductive materials 13 becomes zero, and a permanent direct current begins to flow through the respective looped circuits composed of the superconductive materials 13 filled in both end rings 5 and two bars 4 at the same time as the synchronous incoming. After this, these looped circuits operate as the field windings of the synchronous motor, so that the operation as the synchronous motor becomes possible and the torque-speed characteristics as shown by (3) in FIG. 4 are obtained.

The metallic conductor composing the squirrel cage rotor has not only the function as a holding member of the superconductive material 13 but also the function as damper windings during the time when the motor according to the present invention is being operated as the synchronous motor, so that also the transition stability as the synchronous motor is improved.

In addition, although the looped circuit is formed by composing merely partially hollow plural bars 4 of bar conductors and filling the hollow portions 10 with the superconductive material 13 in the above described preferred embodiment, if also other bars 4 are hollow and filled with the high-resistance material, the characteristics as the induction motor at the starting can be improved, concretely, the unbalance of the secondary resistance can be removed.

Cooling means is necessary in the operation of the motor according to the present invention, as above described. So, a motor apparatus comprising the motor according to the present invention and cooling means therefor is described.

Figure 9:
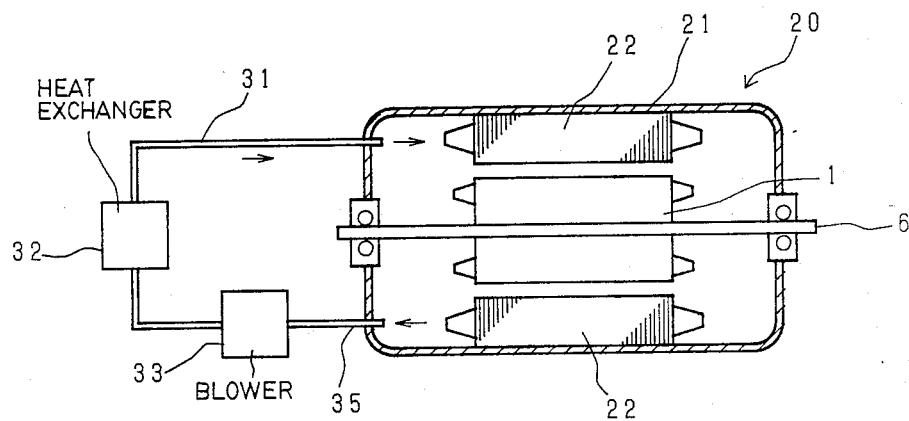
FIG. 9 is a schematic sectional view showing a construction of a first preferred embodiment of the motor apparatus according to the present invention.

FIG. 9 is a schematic sectional view showing a first preferred embodiment of a motor apparatus according to the present invention.

Referring to FIG. 9, reference numeral 20 designates the above described motor 20 according to the present invention. In the present preferred embodiment the motor 20 is a hermetic type one whose casing 21 is closed up tight. And, the casing 21 is provided with an exhaust pipe 35 and a coolant supply pipe 31 connected thereto, both said exhaust pipe 35 and said coolant supply pipe 31 being circularly connected to the casing 21 through a blower 33 and a heat exchanger 32.

The preferred embodiment shown in this FIG. 9 is on the assumption that a so-called high-temperature superconductive material having a critical temperature of, for example, 80° K. or more is used. And, a gaseous coolant, such as liquid nitrogen, is used as the coolant and the rotor is cooled to the critical temperature or less by putting the coolant into the casing 21 after the starting of the motor.

Figure 10:
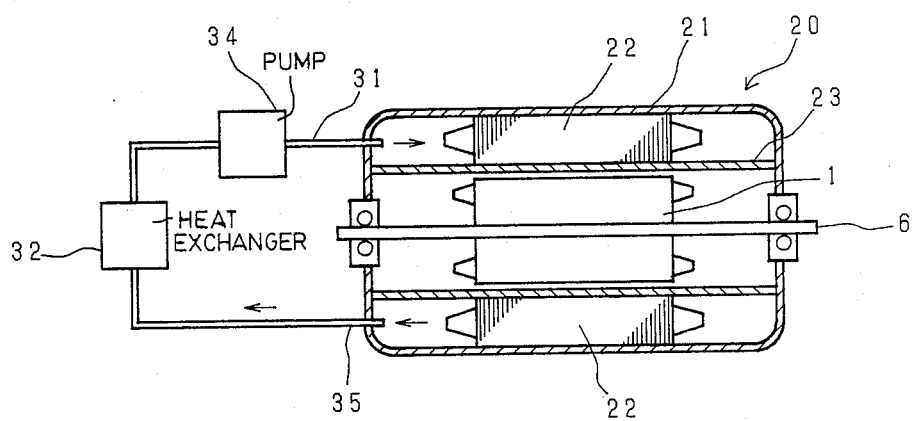
FIG. 10 is a schematic sectional view showing a construction of a second preferred embodiment of the motor apparatus according to the present invention.

On the other hand, FIG. 10 is a schematical sectional view showing a construction of a second prefered embodiment of a motor apparatus according to the present invention.

In this preferred embodiment, the motor 20 is a canned type one. That is to say, a nonmagnetic steel plate 23 is lined on an inside diameter side of a stator 22 (on the rotor side) to form a can together with a casing 21, whereby closing up the stator 22 tight. And, an exhaust pipe 35 and a coolant supply pipe 31 are connected to the can portion comprised of the casing 21 and the nonmagnetic steel plate 23, both the exhaust pipe 35 and the coolant supply pipe 31 being circularly connected to the can portion through a heat exchanger 32 and a pump 34.

In this preferred embodiment shown in FIG. 10, the superconductive material having a critical temperature further lower than 80° K. is used, so that a coolant, such as liquid nitrogen, is used as the coolant and the rotor is cooled to the critical temperature or less by putting the coolant into the casing 21.

It goes without saying that the gaseous coolant may be used also in this second preferred embodiment.

As above described in detail, with the motor according to the present invention, the starting as the usual squirrel cage induction motor superior in staring characteristic is possible by stating in an atmosphere of room temperature. In addition, if the squirrel cage rotor is cooled to the critical temperature or less of the superconductive material to form the looped circuit of the superconductive material at the completion of the acceleration after the starting, the synchronous pulling is automatically carried out and after this, the very highly efficient operation as the synchronous motor by the permanent current becomes possible.

In addition, the superconductive materials are adapted to be covered with the usual metallic conductors, so that they can contribute to the improvement of the transition stability as the damper windings and furthermore, their loss, breakage and the like can be prevented also in the case where comparatively fragile superconductive materials are used.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A motor being provided with a squirrel cage rotor comprising a plurality of bar conductors short-circuited by two opposite circular conductors at respective both ends thereof,
    wherein said squirrel cage rotor has spaces, in which superconductive materials are filled, at each said bar conductor and each said circular conductor,
    respective pair of bar conductors being electrically connected to both circular conductors so that the superconductive materials filled in the respective bar conductors and circular conductors may form looped circuits, which are symmetrical relative to a center line of a magnetic pole of said squirrel cage rotor, of a number equal to a number of the magnetic poles.

2. A motor as set forth in claim 1, in which said spaces comprise hollow portions formed in said bar conductors and circular conductors.

3. A motor as set forth in claim 1, in which said spaces comprise grooved portions formed in said circular conductors.

4. A motor as set forth in claim 1, in which said superconductive materials are ceramic materials of Y-Ba-Cu-O derivative.

5. A motor apparatus being provided with a motor which has a squirrel cage rotor comprising a plurality of bar conductors short-circuited by two opposite circular conductors at respective both ends thereof,
    wherein said motor is a hermetic type one,
    said squirrel cage rotor has spaces, in which superconductive materials are filled, at each said bar conductor and each said circular conductor,
    respective pairs of bar conductors being electrically connected to both circular conductors so that the superconductive materials filled in the respective bar conductors and circular conductors are able to form looped circuits, which are symmetrical relative to a center line of a magnetic pole of said squirrel cage rotor, of a number equal to a number of the magnetic poles, and further comprising a cooling means for cooling an inside of said hermetic type motor by a gaseous coolant.

6. A motor apparatus as set forth in claim 5, in which said spaces comprise hollow portions formed in said bar conductors and circular conductors.

7. A motor apparatus as set forth in claim 5, in which said spaces comprise grooved portions formed in said circular conductors.

8. A motor apparatus as set forth in claim 5, in which said superconductive materials are ceramic materials of Y-Ba-Cu-O derivative.

9. A motor apparatus being provided with a motor which has a squirrel cage rotor comprising a plurality of bar conductors short-circuited by two opposite circular conductors at respective both ends thereof, wherein said motor is a canned type one, said squirrel cage rotor has spaces, in which superconductive materials are filled, at each said bar conductor and each said circular conductor, and respective pairs of bar conductors being electrically connected to both circular conductors so that the superconductive materials filled in the respective bar conductors and circular conductors are able to form looped circuits, which are symmetrical relative to a center line of a magnetic pole of said squirrel cage rotor, of a number equal to a number of the magnetic poles, and further comprising a cooling means for cooling an inside of said canned type motor by a coolant.

10. A motor apparatus as set forth in claim 9, in which said coolant is a liquid coolant.

11. A motor apparatus as set forth in claim 9, in which said spaces comprise hollow portions formed in said bar conductors and circular conductors.

12. A motor apparatus as set forth in claim 9, in which said spaces comprise grooved portions formed in said circular conductors.

13. A motor apparatus as set forth in claim 9, in which said superconductive materials are ceramic materials of Y-Ba-Cu-O derivative.

* * * * *